United States Patent [19]
Guerif

[11] Patent Number: 5,185,048
[45] Date of Patent: Feb. 9, 1993

[54] METHOD OF MANUFACTURING A SEPARATOR FRAME FOR A STACK IN AN EXCHANGER DEVICE

[75] Inventor: Gérard Guerif, Boissy Sous Saint Yon, France

[73] Assignee: Eurodia S.A., France

[21] Appl. No.: 698,729

[22] Filed: May 10, 1991

[30] Foreign Application Priority Data

May 15, 1990 [FR] France .................................. 90 06594

[51] Int. Cl.⁵ .............................................. B32B 3/00
[52] U.S. Cl. .................................... 156/256; 156/250; 156/258; 55/158; 204/238; 210/224; 210/321.6; 210/321.75; 210/321.84; 210/397; 210/488
[58] Field of Search .................... 210/231, 488, 321.75, 210/321.84, 224, 321.6, 397; 55/158; 156/250, 256, 258; 204/238

[56] References Cited

U.S. PATENT DOCUMENTS

| | | | |
|---|---|---|---|
| 4,209,575 | 6/1980 | McDowell et al. | 429/149 |
| 4,737,257 | 4/1988 | Boulton | 204/242 |
| 4,832,804 | 5/1989 | Brattan | 204/98 |
| 4,999,107 | 3/1991 | Guerif | 210/224 |

Primary Examiner—David A. Simmons
Assistant Examiner—Merrick Dixon
Attorney, Agent, or Firm—Ladas & Parry

[57] ABSTRACT

Each separator frame constitutes a single part. It is made by assembling two thermoplastic films having the shape of the seal plane and sandwiched over two different types of thermoplastic expanded structure, e.g. polyethylene grids, a first one of these structures being designed to occupy the central opening of the frame and the second type of structure being designed to occupy the diffusers. According to the invention, and prior to assembly, the first expanded structure is crushed by hot compression over its entire area apart from the central opening. This crushing reduces the thickness of the expanded structure, preferably by more than 50%. Cut-outs are formed in the first structure after it has been compressed in this way and cut-out pieces of the second expanded structure are placed therein, which pieces are themselves crushed in side strips for the purpose of retaining them in the assembly.

5 Claims, 2 Drawing Sheets

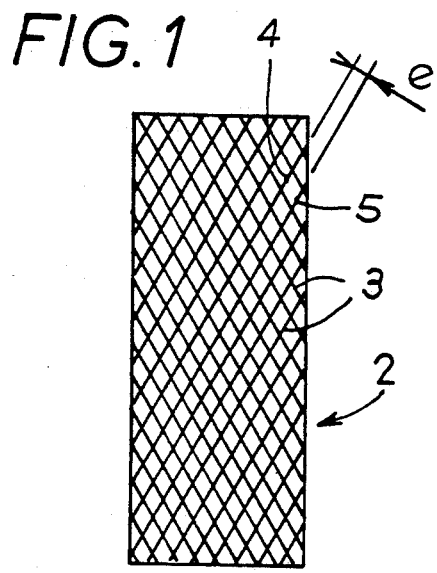
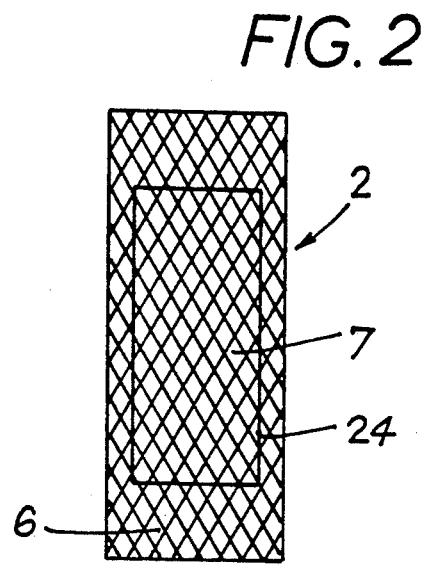
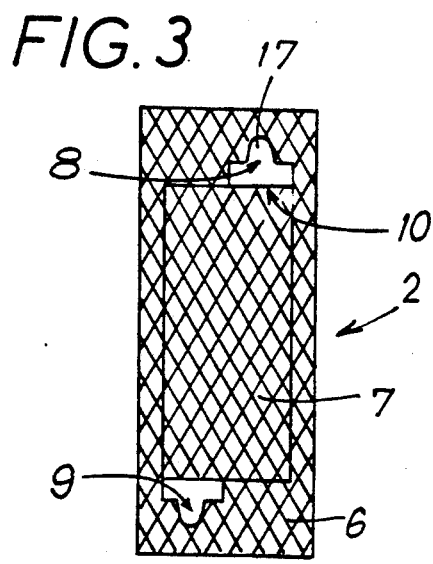
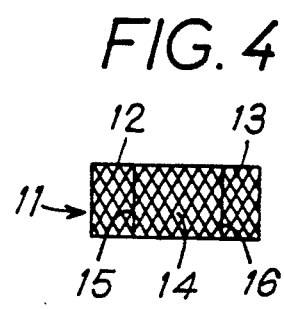
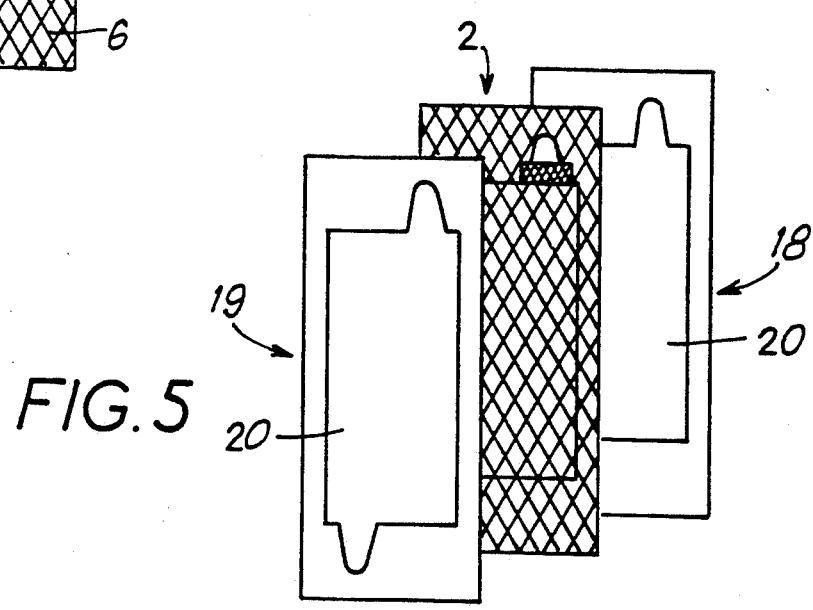

METHOD OF MANUFACTURING A SEPARATOR FRAME FOR A STACK IN AN EXCHANGER DEVICE

The present invention relates to manufacturing a separator frame for separating two exchange membranes and enabling fluids to flow through exchanger devices of the dialysis, electrodialysis, reverse osmosis, or ultrafiltration type.

BACKGROUND OF THE INVENTION

In membrane exchanger devices, exchange membranes are placed parallel to one another in the form of a stack, and they are held separate from one another by separator frames. These frames are constituted by a rigid part which is called the "seal plane" and which provides sealing for the device. This part is pierced by orifices which allow fluids to flow through the stack: these orifices make up ducts for feeding and removing fluids. A perforated or expanded grid structure allows fluids to flow in the open central portion of the frame and between said central portion and one or other of the fluid flow orifices via openings referred to as "diffusers".

Each exchange zone is constituted by a stack comprising a first exchange membrane which is permeable to certain substances, a separator frame, and a second exchange membrane which is permeable to the same substances or to other substances.

There are three types of separator frame. Frames of the first type are constituted by parts that are not fixed to one another, namely: the seal plane; the expanded structure occupying the central opening; and the expanded structures corresponding to the diffusers. The building of such a stack thus requires a large number of parts to be accurately installed, which operation is very difficult and lengthly.

A second type of frame remedies this drawback in that each separator frame is constituted by a single part. Such a frame may be made, in particular, by assembling a plurality of thermoplastic sheets cut-out to the shape of the seal plane, with the expanded structure being sandwiched between them.

This second type of frame nevertheless suffers from drawbacks. In order to be able to assemble the seal plane and the expanded structure, it is necessary to select certain thermoplastic materials. Not only is the resilience of such materials generally lower than that of a traditional seal plane made of rubber, but the presence of an expanded structure within the assembly also considerably reduces its resilience, as happens in any reinforced material. This lower resilience seal plane requires higher clamping pressure to be applied to the stack in order to obtain proper sealing, thereby running the risk of buckling.

A third type of separator frame is described in the document DE-1-3 103 464. The frame is constituted by a single piece. It is obtained by molding the seal plane onto the edges of the expanded structure, with the seal plane being provided with elongate seals. In the method described, the edges of the expanded structure are subjected to compression to reduce their thickness, with the seal plane then being molded onto the compressed portion so that the non-compressed portion of the expanded structure situated in the central opening is of substantially the same thickness as the frame where it has the elongate seals.

Such crushing has the effect of flattening the component parts constituting the expanded structure, which parts are generally initially substantially circular in section. Such flattening reduces the thickness of the expanded structure in the seal plane. As a result, the loss of resilience due to the presence of the expanded structure is relatively speaking considerably less than it would be with a non-flattened expanded structure. It will be understood that an expanded structure having component parts of smaller diameter could not be used. It is important for the thickness of the seal plane in the frame to be substantially equivalent to or slightly greater than the thickness of the expanded structure since otherwise the membranes are not supported and are subjected to deformation the hinders proper operation of the exchanger device.

In Document DE-A-3 103 464, provision is made to enable the expanded structure to occupy the central opening and also the diffusers.

However, it is technically advantageous for the type of expanded structure that occupyies the diffusers to be different from the expanded structure occupying the central opening, and in particular it is desirable for the mesh to be denser and possibly also for its thickness to be greater.

This can be achieved using frames of the first type, but not with frames of the second or third above-mentioned types.

An object achieved by the present invention is to provide a method of manufacturing a one-piece frame capable of including different expanded structures in the central opening and in the diffusers, while also providing good sealing.

SUMMARY OF THE INVENTION

The present invention provides a method of manufacturing a separator frame for stacking in an exchanger device, said frame comprising: firstly an impermeable seal frame having a central opening, fluid flow orifices, and two diffusers connecting the central opening to said orifices; and secondly at least one expanded structure occupying the central opening and the diffusers. In conventional manner, the method consists in assembling thermoplastic films having the shape of the seal plane with the expanded structure being interposed therebetween.

The invention includes the improvements whereby:

prior to assembly, a first expanded structure made of a thermoplastic material is subjected to crushing by applying hot compression to its entire area except for the central opening;

cut-outs corresponding to the diffusers and to lateral extension zones of each diffuser are formed in the expanded structure partially crushed in this way; and assembly is performed after pieces of a second expanded structure have been placed in the cut-out locations corresponding to each of the diffusers and its lateral zone, said pieces having crushed lateral tabs for occupying zones that extend the diffusers laterally, with the cut-outs corresponding to the fluid flow orifices being formed either before or after assembly.

Thus, the assembly achieves in a single operation: building up the seal plane; installing the first expanded structure in the central opening; and installing the second expanded structure in the, or each, diffuser, with the lateral tabs serving to retain the second structure in the seal plane. In addition, since the lateral tabs are also crushed so as to obtain the same thickness as the first expanded structure, there is no non-uniformity in the resilience of the seal plane. Naturally the configuration of the second piece of expanded structure must be as close as possible, after crushing, to the location left empty by the cut-out for the diffusers and the lateral zones extending the diffusers.

Assembly is preferably performed in conventional manner by high-frequency welding.

Of thermoplastic films having suitable resilience and suitable for high-frequency welding, ethyl vinyl acetate is particularly preferred. In this case, it is advantageous to use a polyethylene grid as the expanded structure. Ethyl vinyl acetate adheres well to the polyethylene of the expanded structure during assembly.

BRIEF DESCRIPTION OF THE DRAWINGS

An embodiment of the invention is described by way of example with reference to the accompanying drawings, in which:

FIG. 1 is a diagram of the first expanded structure prior to crushing;

FIG. 2 is a diagram of the first expanded structure with the crushing zone being delimited thereon;

FIG. 3 is a diagram of the first expanded structure after crushing and cutting out;

FIG. 4 is a diagram of the second expanded structure, after it has been crushed;

FIG. 5 is a diagram showing how the thermoplastic films and the expanded structures are superposed prior to being assembled together;

DETAILED DESCRIPTION

Figure 6:
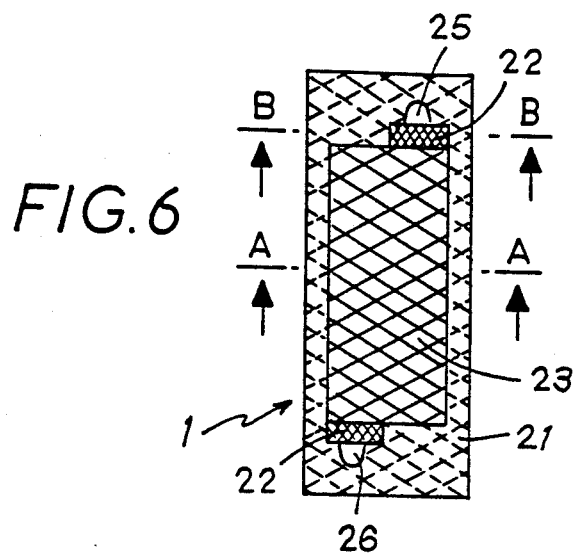
FIG. 6 is a plan view of a separator frame of the invention after it has been assembled.

The separator frame 1 whose manufacture is described below is designed for fitting to a pilot installation. It comprises a rectangle of 20 cm × 51 cm.

The first expanded structure shown in FIG. 1 is a polyethylene grid 2 having the same dimensions as the frame. The grid 2 is constituted by interlaced thread components 3 of substantially circular section constituting a diamond-shaped mesh. The spacing e of pairs of parallel and adjacent thread components 4 and 5 is substantially 3 mm. The larger angle of the diamond-shape is about 130°. The diameter of each thread component 3 is about 0.425 mm.

The entire peripheral area 6 of the first grid 2 delimiting a rectangular central portion 7 of continuous outline 24 is hot compressed. The conditions under which compressing is performed depend on the material from which the grid is made and on the desired thickness h (FIG. 7) relative to the thickness H of the grid 2 prior to being compressed. The temperature is close to the softening point of said material, and in the example shown, the thickness h of the flattened grid 2 is 0.2 mm, whereas its thickness H prior to compression was 0.85 mm.

Two locations 8 and 9 are cut-out from the flattened portion 6 of the grid 2, which locations are symmetrically disposed about the central portion 7 and make contact therewith. Each cut-out is rectangular in shape having one of its long sides 10 in common with the central portion 7 and having the middle of its other long side deformed by a partially rounded outward extension 17, as shown in FIG. 3. The exact shape required for each of the cut-outs 8 and 9 will be understood on reading the description below.

Rectangular pieces 11 of a second expanded structure are prepared (FIG. 4). This second structure is a polyethylene grid obtained using the same thread components as the first grid 2, thus having the same total thickness H of 0.85 mm. However, its mesh size is tighter, with the spacing of pairs of parallel and adjacent thread components being about 1.5 mm and with the larger angle of the mesh being about 120°. The dimensions of the piece 11 are determined so that after two side strips 12 and 13 of the piece 11 have been crushed, the piece is as an exact a fit as possible in the location 8 or 9 left empty by the cut-out formed in the first grid 2. In the example described, the piece 11 is constituted by a rectangle of 6 cm × 3 cm.

The lateral strips 12 and 13 of the piece 11 are crushed under conditions similar to those described above, thereby delimiting a non-flattened central strip 14 as shown by continuous lines 15 and 16 in FIG. 4.

When the piece 11 is placed in the location 8 or 9 as defined by a cut-out, the outer extension 17 extends the central strip 14.

FIG. 5 shows three superposed components: two thermoplastic films 18 and 19, and the grid 2 after the two pieces 11 have been installed as described above. The grid 2 lies between the two films 18 and 19. Each of the films 18 and 19 is constituted by an ethyl vinyl acetate. Each film is rectangular in shape and has the same outside dimensions as the frame 1. Each film includes an open portion 20 whose shape and disposition correspond to the non-crushed central portion 7 of the first grid 2 plus the two cut-outs 8 and 9 formed in the first grid 2 except for the pairs of zones corresponding to the pairs of lateral strips 12 and 13 of the installed pieces 11.

Figure 7:
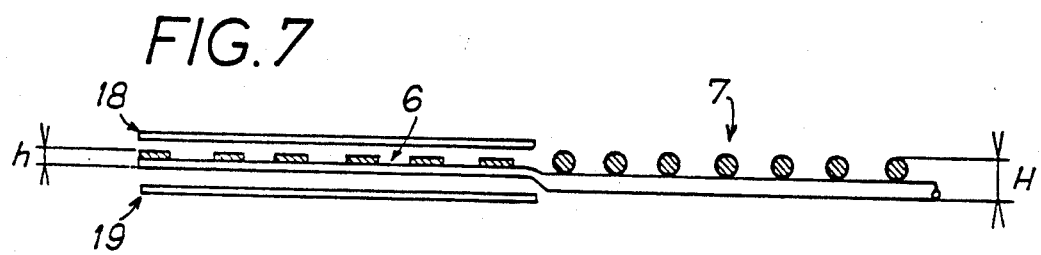
FIGS. 7 and 8 are section views on line AA of FIG. 6 respectively before and after assembly.

As can be seen in FIG. 7, the thermoplastic films 18 and 19 in the superposition of three components face the crushed portions 6 of the grid 2.

Assembly is performed by the conventional technique of high frequency welding. In this operation, the ethyl vinyl acetate films 18 and 19 are raised both in temperature and in pressure so as to form a coherent assembly constituting the seal plane 21 of the separator frame 1. The coherence of this assembly is enhanced by the fact that since the grids 2 and 11 are made of polyethylene they adhere securely to the ethyl vinyl acetate of the films.

Figure 8:

The thickness of the seal plane (FIG. 8) is substantially the same as the thickness of the first grid 2.

Figure 9:
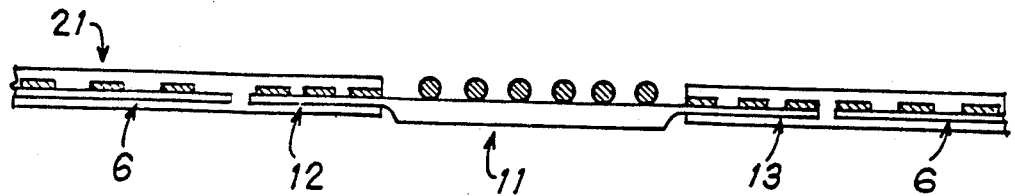
FIG. 9 is a section view on line BB of FIG. 6.

As can be seen from FIG. 9, the second grid 11 is securely retained in the seal plane 21 by assembling the films 18 and 19 together over the flattened lateral strips 12 and 13. The non-flattened portion of each second grid 11 which is therefore not assembled directly in the seal plane 21 thus corresponds to a diffuser 22 of the separator frame 1, while the non-flattened portion of the first grid 2 which is not directly assembled in the seal plane 21 corresponds to the exchange zone 23 of the separator frame 1. The cut-out zones 8 and 9 that are not covered by any of the grids 2 and 11 corresponds to orifices 25 and 26 for fluid flow.

The invention is not limited to the implementation described by way of non-limiting example, and it extends to any variant thereof. In particular, the thermoplastic films may be made of some other material, polyvinyl chloride, ethyl butyl acetate, or polyurethane, all of which materials can be high frequency welded and have a degree of resilience.

In another variant implementation, the zones corresponding to fluid flow orifices may be cut out only after the component parts have been assembled. In which case the locations 8 and 9 are rectangular and suitable for receiving the pieces 11 of the second expanded structure.

Further, in order to obtain very accurate positioning of the thermoplastic films 18 and 19 and of the grid 2 for assembly purposes, it is preferable for each of these components to be larger in size than the dimensions specified in the above example so as to be provided with a peripheral centering zone, with identically located openings being formed in said zone during the first cutting out operation such that centering studs can be received in said peripheral openings while the two films 18 and 19 and the grid 2 are being superposed. After assembly, the separator frame is cut down to size by cutting off the assembled peripheral zones.

I claim:

1. A method of manufacturing a separator frame for stacking in an exchanger device, said frame including an impermeable seal frame having a central opening fluid flow orifices, two diffusers connecting the central opening to said orifices and peripheral seal planes, and at least one expanded structure occupying the central opening and the diffusers; said method comprising the steps of:

crushing a first expanded structure made of a thermoplastic material by applying hot compression to its entire area except a portion for said central opening;

forming cut-outs in the first expanded structure partially crushed, said cut-outs corresponding to the diffusers and lateral extension zones of the diffusers;

placing pieces of a second expanded structure in the location of the cut-outs thereby occupying the same, said pieces having crushed lateral tabs for occupying the lateral extension zones of the diffusers; and assembling thermoplastic films having the shape of the seal plane with the first expanded structure being interposed therebetween;

wherein other cut-outs corresponding to the fluid flow orifices are formed either together with the diffuser cut-outs or after the assembling step.

2. A method according to claim 1, wherein assembly is performed by high frequency welding.

3. A method according to claim 2, wherein the expanded structures are polyethylene grids and the thermoplastic films constituting the seal plane are made of ethyl vinyl acetate.

4. A method according to claim 1, wherein the expanded structures respectively of the central opening and of the diffusers are constituted by diamond-shaped grids, the grid of each diffuser having a denser mesh than the grid of the central opening.

5. A method according to claim 1, wherein each of the two thermoplastic films and the first expanded structure have a peripheral centering zone, wherein centering openings are cut out in identical positions in each of said zones prior to assembly, with superposition being performed by centering studs being received in the centering openings, and wherein the separator frame is cut down after assembly to remove the assembled peripheral zones.

* * * * *